(12) United States Patent
Xu et al.

(10) Patent No.: US 11,234,073 B1
(45) Date of Patent: Jan. 25, 2022

(54) SELECTIVE ACTIVE NOISE CANCELLATION

(71) Applicant: Facebook Technologies, LLC, Menlo Park, CA (US)

(72) Inventors: Buye Xu, Sammamish, WA (US); Antonio John Miller, Woodinville, WA (US); Jacob Ryan Donley, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/683,807

(22) Filed: Nov. 14, 2019

Related U.S. Application Data

(60) Provisional application No. 62/871,050, filed on Jul. 5, 2019.

(51) Int. Cl.
*H04R 3/00* (2006.01)
*H04R 1/10* (2006.01)
(Continued)

(52) U.S. Cl.
CPC ......... *H04R 3/005* (2013.01); *G10K 11/1781* (2018.01); *G10K 11/17881* (2018.01); *H04R 1/1083* (2013.01); *G02B 27/017* (2013.01); *G10K 11/17823* (2018.01); *G10K 11/17827* (2018.01); *G10K 2210/1081* (2013.01); *G10K 2210/11* (2013.01); *G10K 2210/3028* (2013.01);
(Continued)

(58) Field of Classification Search
CPC .. H04R 3/005; H04R 1/1083; H04R 2460/01; H04R 1/406; G10K 11/17881; G10K 11/1781; G10K 2210/1081; G10K 2210/3028; G10K 11/17827; G10K 11/17823; G10K 2210/3046; G10K 2210/3044; G10K 2210/3056; G10K 2210/111; G02B 27/017; G10L 21/0208
See application file for complete search history.

(56) References Cited

U.S. PATENT DOCUMENTS

| | | | |
|---|---|---|---|
| 6,593,956 B1 * | 7/2003 | Potts | H04R 3/005 348/14.09 |
| 9,111,522 B1 * | 8/2015 | Worley, III | G10K 11/17837 |

(Continued)

*Primary Examiner* — Matthew A Eason
*Assistant Examiner* — Kuassi A Ganmavo
(74) *Attorney, Agent, or Firm* — FisherBroyles, LLP

(57) ABSTRACT

The disclosed computer-implemented method may include accessing environment information identifying an undesired sound source within an environment. The method may further include determining, based on the accessed environment information, a spatial location of the undesired sound source in the environment that is to be attenuated using an active noise cancelling (ANC) signal. The method may also include forming a microphone beam, using two or more microphones, directed at the determined spatial location, where the microphone beam is configured to capture audio information from the determined spatial location. Still further, the method may include generating an ANC signal using the audio information captured using the microphone beam, and playing back the generated ANC signal to attenuate the undesired sound source at the determined spatial location. Various other methods, systems, and computer-readable media are also disclosed.

20 Claims, 11 Drawing Sheets

(51) Int. Cl.
*G10K 11/178* (2006.01)
*G02B 27/01* (2006.01)
*G10L 21/0208* (2013.01)

(52) U.S. Cl.
CPC ............... *G10K 2210/3044* (2013.01); *G10K 2210/3046* (2013.01); *G10K 2210/3056* (2013.01); *G10L 21/0208* (2013.01); *H04R 2460/01* (2013.01)

(56) References Cited

U.S. PATENT DOCUMENTS

| | | | | |
|---|---|---|---|---|
| 10,506,362 | B1* | 12/2019 | Gomes | H04S 7/303 |
| 2005/0006142 | A1* | 1/2005 | Ishimaru | H05K 1/187 |
| | | | | 174/262 |
| 2008/0247565 | A1* | 10/2008 | Elko | H04R 3/005 |
| | | | | 381/92 |
| 2008/0304677 | A1* | 12/2008 | Abolfathi | G10K 11/17885 |
| | | | | 381/71.1 |
| 2008/0317260 | A1* | 12/2008 | Short | H04R 29/004 |
| | | | | 381/92 |
| 2012/0051548 | A1* | 3/2012 | Visser | G10L 21/0208 |
| | | | | 381/56 |
| 2012/0218371 | A1* | 8/2012 | Cutler | H04N 7/142 |
| | | | | 348/14.01 |
| 2012/0327115 | A1* | 12/2012 | Chhetri | H04R 3/005 |
| | | | | 345/633 |
| 2013/0082875 | A1* | 4/2013 | Sorensen | H04R 1/406 |
| | | | | 342/368 |
| 2014/0337023 | A1* | 11/2014 | McCulloch | G06F 1/163 |
| | | | | 704/235 |
| 2015/0181329 | A1* | 6/2015 | Mikami | H04R 3/005 |
| | | | | 381/71.11 |
| 2016/0071526 | A1* | 3/2016 | Wingate | G01S 3/802 |
| | | | | 704/233 |
| 2016/0232888 | A1* | 8/2016 | Short | H04M 1/6008 |
| 2016/0284362 | A1* | 9/2016 | Oda | G10L 21/0208 |
| 2017/0004818 | A1* | 1/2017 | Khatua | G10K 11/17875 |
| 2017/0061953 | A1* | 3/2017 | An | G10K 11/17821 |
| 2017/0105066 | A1* | 4/2017 | McLaughlin | H04R 3/005 |
| 2017/0337936 | A1* | 11/2017 | Han | H04R 3/005 |
| 2018/0226085 | A1* | 8/2018 | Morton | G10L 21/0264 |
| 2018/0227665 | A1* | 8/2018 | Elko | H04R 1/406 |
| 2018/0270571 | A1* | 9/2018 | Di Censo | H04R 3/005 |
| 2018/0302738 | A1* | 10/2018 | Di Censo | G06F 3/165 |
| 2019/0174237 | A1* | 6/2019 | Lunner | G06F 3/015 |

* cited by examiner

SELECTIVE ACTIVE NOISE CANCELLATION

CROSS REFERENCE TO RELATED APPLICATION

This application claims priority to and the benefit of U.S. Prov. Application No. 62/871,050, filed Jul. 5, 2019, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
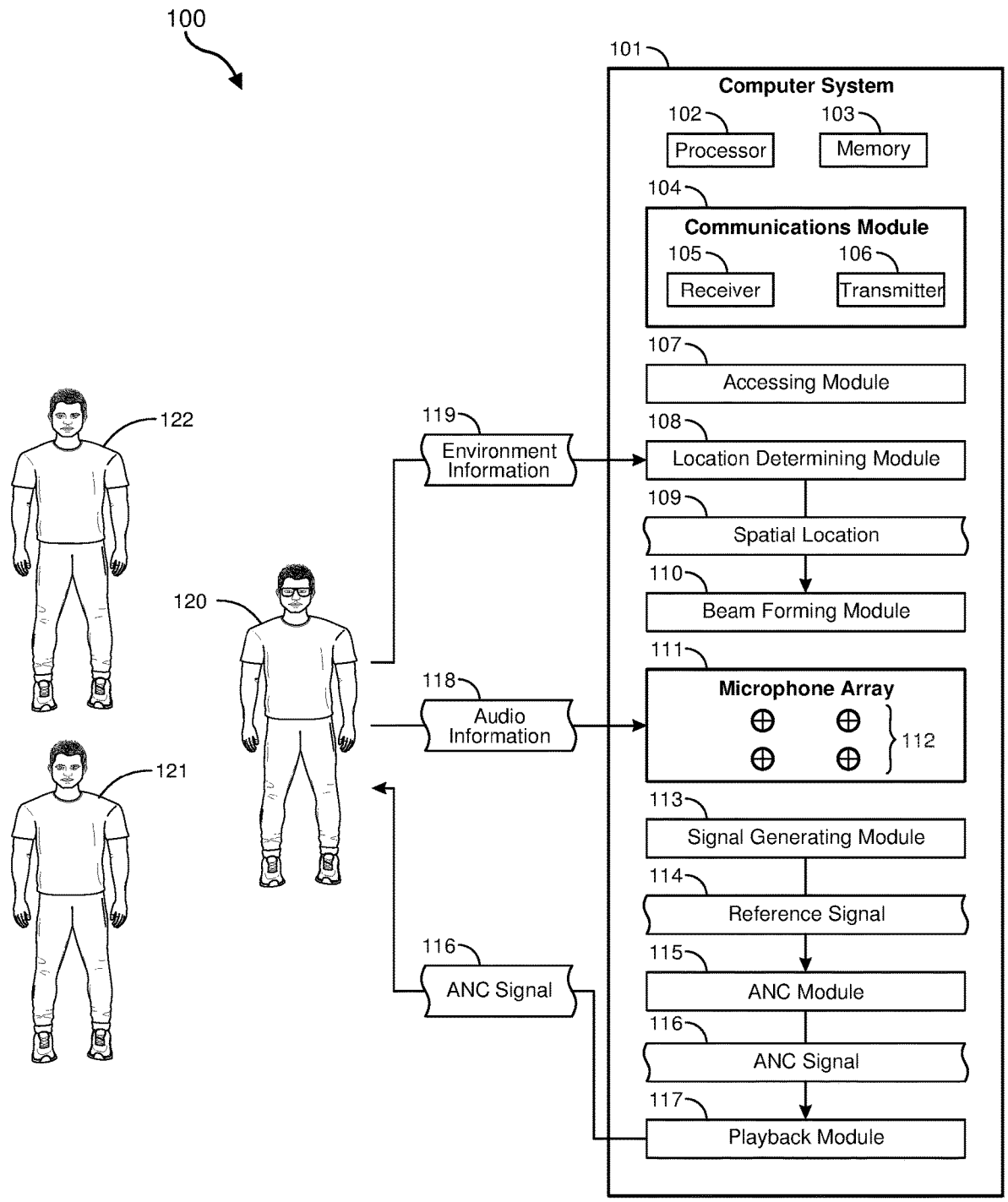
FIG. 1 illustrates a computing environment in which active noise cancellation (ANC) is selectively applied to undesired noise sources.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Historically, active noise cancellation (ANC) technologies have been applied in headphones or earbuds to physically cancel sounds that are received at the user's ears. These traditional ANC systems include microphones that listen for sounds and generate a noise cancelling signal that is out of phase with the detected sounds, thereby cancelling (or at least attenuating) the detected sounds. Traditional ANC systems on headphones or earbuds, however, are designed to listen for and attenuate the sounds detected from all directions and from all sound sources around the user. This may be nice in some situations such as when a user is on an airplane and wishes to sleep or concentrate on work. The noise cancelling signal is applied to all sounds regardless of direction. In this example, however, the user may begin to talk to someone (e.g., a stewardess) while ANC is blindly applied to that person's speech, even if the user may be willing to listen to that speech.

Accordingly, the embodiments of this disclosure are directed to an adaptive ANC system that attempts to preserve sound sources from certain directions or locations relative to a listener and only attenuate (or apply ANC to) the sounds from undesired directions. As will be explained in greater detail below, embodiments of the present disclosure may perform the selective active noise cancellation based on spatial information associated with various sound sources in an environment. The spatial information may indicate, for example, where other persons are within a room or outdoor space. The spatial information may also indicate where televisions, speakers, or other sound-producing devices are located within an environment. This information may then be used to direct a noise cancelling signal in that direction or, in other words, block noise from a specified direction while simultaneously allowing sounds from other directions or locations. These concepts will be described in greater detail below with regard to FIGS. 1-13.

FIG. 1 illustrates a computing environment 100 in which ANC is selectively applied to undesired sound sources. The computing environment 100 includes a computer system 101. The computer system 101 may be substantially any type of computer system including a local computer system, an embedded computer system, or a distributed (e.g., cloud) computer system. The computer system 101 includes at least one processor 102 and at least some system memory 103. The computer system 101 also includes program modules for performing a variety of different functions. The program modules are hardware-based, software-based, or include a combination of hardware and software. Each program module uses computing hardware and/or software to perform specified functions, including those described herein below.

For example, the communications module 104 may communicate with other computer systems. The communications module 104 may include wired or wireless communication means that receive and/or transmit data to or from other computer systems. These communication means may include hardware radios including, for example, a hardware-based receiver 105, a hardware-based transmitter 106, or a combined hardware-based transceiver capable of both receiving and transmitting data. The radios may be WIFI radios, cellular radios, Bluetooth radios, global positioning system (GPS) radios, or other types of radios. The communications module 104 may interact with databases, mobile computing devices (such as mobile phones or tablets), embedded or other types of computing systems.

The computer system 101 may also include an accessing module 107. The accessing module 107 may be configured to access environment information 119. The environment information 119 may be received from electronic devices within the environment (e.g., from artificial reality devices such as augmented reality glasses or virtual reality goggles). Some of these electronic devices may have mapping capabilities, cameras, microphones, speakers, radios (e.g., GPS radios), inertial measurement units (IMUs), and other hardware components that provide environment data 119. In other cases, the environment information 119 may be received from other local or remote networked computer systems or databases. In some embodiments, the environment information 119 may include simultaneous location and mapping (SLAM) data that notes the spatial location of objects, persons, devices, and other items within an environment. The environment information 119 may be distributed in a live manner, or may be gathered and stored in a database and accessed at a later time by the accessing module 107. Thus, whether the environment information 119 is live or stored, the accessing module 107 may be configured access that information, from a single source or from multiple different sources.

The computer system 101 may also include a location determining module 108. When determining how to selectively apply ANC to undesired sound sources, the embodiments herein may first determine the spatial location of those undesired sound sources. As referred to herein, an object's "spatial location" may refer to that object's two-dimensional or three-dimensional location in space. Any information associated with that location may be referred to as "spatial location information." In some cases, the environment information 119 identified above may include GPS coordinates for the sound source (e.g., the GPS location of a television hung on a wall). In cases where the environment information 119 does not include explicit location information, the location determining module 108 may use various methods to gather spatial location information 109 and determine the spatial location of a given sound source. For example, the location determining module 108 may implement direction of arrival (DoA) information, depth camera information, inertial motion unit (IMU) information, or other sensor input to determine where a given sound source (e.g., a person (e.g., 120-122) or an electronic device) is currently located.

Once the sound source's spatial location has been determined, the beamforming module 110 of computer system 101 may initialize a microphone array 111 to gather audio information 118 from the sound sources (e.g., 120-122). The beamforming module 110 may direct the microphone array 111 to listen to sounds from specific spatial locations. As the microphones 112 of the microphone array 111 capture sounds from the determined spatial location(s), the signal generating module 113 may then generate a reference signal 114 from the sounds gathered from the various spatial locations. The ANC module 115 may then generate an ANC signal 116 using the reference signal 114. The playback module 117 may then play back the generated ANC signal 116 to cancel or substantially attenuate the sounds coming from the specified spatial location(s) 109. This process will be described further below with regard to method 200 of FIG. 2.

Figure 2:
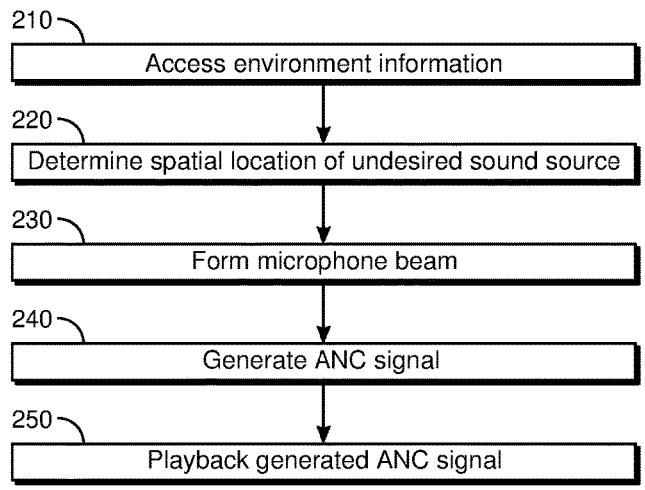
FIG. 2 is a flow diagram of an exemplary method for selectively applying ANC to undesired sound sources.

FIG. 2 is a flow diagram of an exemplary computer-implemented method 200 for selectively applying active noise cancellation to a specified spatial location. The steps shown in FIG. 2 may be performed by any suitable computer-executable code and/or computing system, including the system illustrated in FIG. 1. In one example, each of the steps shown in FIG. 2 may represent an algorithm whose structure includes and/or is represented by multiple sub-steps, examples of which will be provided in greater detail below. Features from any of the embodiments described herein may be used in combination with one another in accordance with the general principles described herein. These and other embodiments, features, and advantages will be more fully understood upon reading the following detailed description in conjunction with the accompanying drawings and claims.

As illustrated in FIG. 2, at step 210 one or more of the systems described herein may access one or more portions of environment information identifying at least one undesired sound source in the environment. As noted above, the accessing module 107 of computer system 101 of FIG. 1 may access environment information 119 from one or more sources. The environment information 119 may include information that explicitly or implicitly identifies the location of various sound sources 120-122. Some of these sound sources may be desired and some may be undesired. A "desired sound" or "desired sound source," as described herein, may be a sound or sound source that a particular user wants to hear or, conversely, does not want cancelled by ANC. Desired sounds may be different for each user and may be specified in settings or profiles or may be inferred based on where the user is directing their attention.

For example, in some cases, a user (e.g., 120 of FIG. 1) may be wearing artificial reality glasses that have embedded cameras, speakers, and microphones, among other electronic components. These artificial reality glasses may include processing logic (or may offload such to other computer systems) that identifies which direction the user is facing, or which person the user is talking to, or which electronic device the user is facing. This logic may infer, at least in some cases, that those users or devices to which the user is giving attention are desired sound sources, whereas other sound sources next to or behind the user may be inferred to be undesired sound sources. Alternatively, in other cases, the user may wish to hear sound sources to which the user is not facing. For example, if a person behind the user is yelling and shouting for help, the user may wish to hear those sounds. Thus, the processing logic may determine that the sound source behind the user is sufficiently loud, or is sufficiently urgent-sounding (e.g., according to tonal analysis), or that the actual spoken words are important for the user to hear. In such cases, sounds next to or behind the user may be desired sounds. Thus, desired sounds do not necessarily come from persons or objects in front of the user.

"Undesired sounds," as used herein, may refer to sounds that the user does not want to hear and to which the user wants ANC to be applied. The accessing module 107 may access environment information 119 indicating where various sound sources are relative to a user or to a device, and the location determining module 108 may then determine the spatial location of each of the sound sources.

Indeed, at step 220 of FIG. 2, the location determining module may determine, based on the accessed environment information 119, a spatial location 109 of at least one undesired sound source in the environment that is to be attenuated using an active noise cancelling (ANC) signal. The location determining module 108 may determine a two-dimensional spatial location 109 for the undesired sound source (as well as any other desired or undesired sound sources), or may determine a three-dimensional spatial location. By knowing the precise spatial location of an undesired sound source, the array of microphones 111 may be directed toward that location. The microphone array 111 may include two, three, four, or more microphones 112. In some embodiments, the microphones may be physically or digitally steered in a given direction. This process is referred to herein as "beamforming." The array of microphones (or at least a subset of microphones in the array) may be directed or beamformed toward a specific spatial location (e.g., 109). At step 230, for example, the computer system 101 may form a microphone beam, using two or more of the microphones 112, directed at the determined spatial location 109. This microphone beam may be configured to capture audio information 118 from the determined spatial location 109.

The signal generating module 113 may optionally form a reference signal 114 using the audio information 118 captured using the microphone beam formed using the microphone array 111. The reference signal 114 includes audio information associated with the undesired sound source (e.g., 121) with minimum latency. The audio information 118 may include talking, singing, yelling, crying, background noises such as traffic, car horns, engine noises, and other sounds. This audio information 118 may then form the basis of the ANC signal that drives the playback system to create a control sound that is out-of-phase relative to the undesired sound. Indeed, at step 240, the ANC module 115 takes into account the response of the playback system and generates an ANC signal 116 using the audio information captured using the microphone beam. The ANC signal may include a control sound that is at least partially out of phase with the undesired sounds coming from the undesired sound source. The ANC signal 116 may also have an amplitude that is substantially similar to that of the undesired sound source. By having a control sound that is at least partially out of phase with the undesired sound source and has an amplitude that is similar to that of the undesired sound source, this ANC signal 116 may be designed to attenuate or even cancel the sounds coming from the undesired sound source. Other sounds, not optimized for cancelation in the reference signal, will be allowed to travel to the user unopposed.

At step 250, the playback module 117 of computer system 101 may play back the generated ANC signal 116 to at least partially attenuate or fully cancel the undesired sound source at the determined spatial location 109. The playback of the ANC signal 116 may occur on headphones or earbuds that are in a user's ear. Or, alternatively, the ANC signal 116 may be played back using speakers in the user's artificial reality glasses (e.g., 406 of FIG. 4, 501 of FIG. 5, 602 of FIG. 6, etc.). Other speakers or other types of speakers may be used to playback the ANC signal to the user to attenuate or cancel the undesired sound source.

Figure 3:
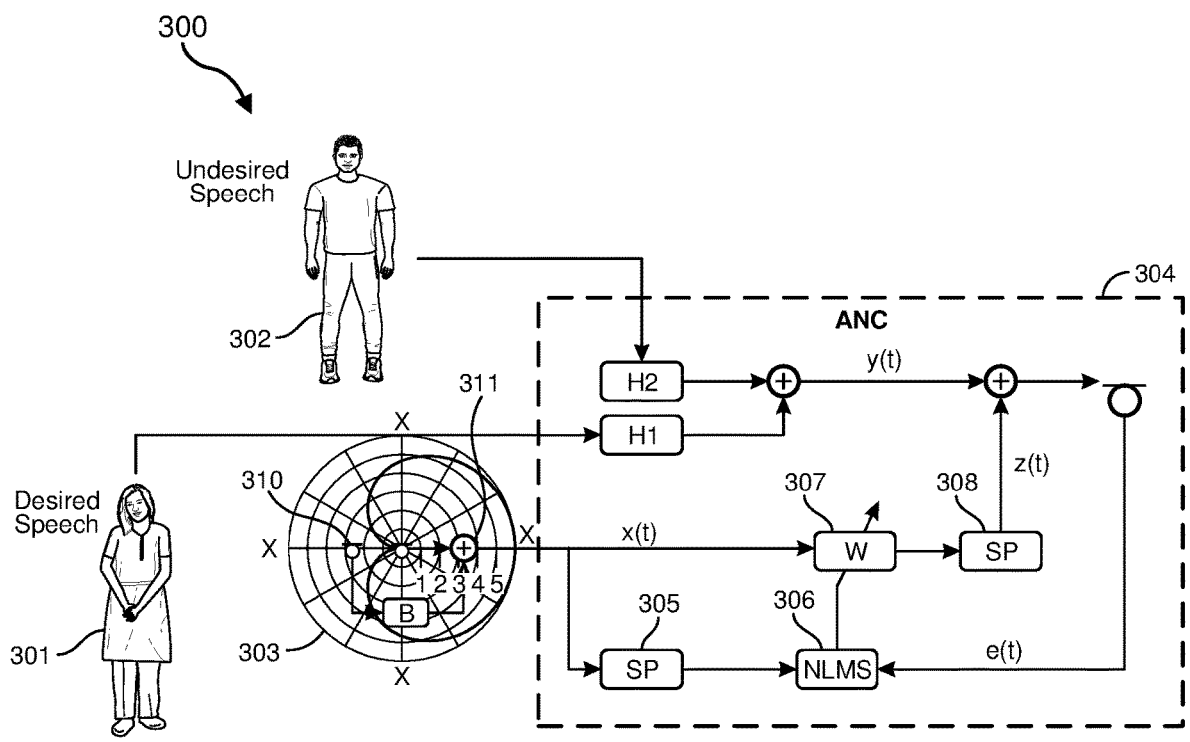
FIG. 3 illustrates an embodiment in which a person is identified as an undesired noise source to which ANC is selectively applied.

FIG. 3, for example, illustrates an embodiment 300 in which a two-microphone array 303 is implemented to selectively apply ANC to an undesired speaker 302, while allowing a desired speaker's sounds to proceed unimpeded. The performance level of the ANC system (e.g., a feedforward ANC system) may be determined by one or more factors, including the leading time of the reference signal (e.g., 114 of FIG. 1) and the group delay of a secondary path (e.g., the path between an anti-noise loudspeaker input and an error microphone output signal). A high level of attenuation (e.g., close to full cancellation) may be achieved if the leading time of the reference signal 114 is longer than the secondary path group delay and, conversely, a relatively low level of attenuation may be achieved if the leading time of the reference signal 114 is shorter in length than the secondary path group delay. Other factors affecting the performance of the ANC system may include the relative signal levels of different sound sources in the reference signal. For example, the weaker the level of a particular sound source is in the reference signal, the smaller the attenuation of that sound source may be.

Selective application of ANC may be achieved by creating a reference signal based on sounds received at a microphone array directed to the area of interest. The reference signal 114 may be designed using beamforming techniques. As such, for the audio components corresponding to the desired sound, the relative energy is minimized while the delay is maximized, and for the audio components corresponding to the undesired sound sources, relative energy is maximized while the delay is minimized.

FIG. 3 illustrates an example where two speaking users 301 and 302 are separated in space. The reference signal x(t) for ANC may be created by an end-fire two-mic array 303 configured to apply a filter-and-sum beamforming algorithm. When applying this beamforming, a null may be pointed to the direction of the desired speaker 301, which significantly reduces the desired sound captured by the beamformer while substantially keeping the sound from the undesired speaker. The embodiments described herein may design the filters in different ways to achieve such a filter-and-sum beamformer. For instance, to generate an effective reference signal for ANC, the leading time of the undesired sound may be maximized while the leading time for the desired sound is minimized. In other words, when creating the beamforming signal, the signal of the microphone that is closest to the undesired sound source may be kept unfiltered whenever possible, and only the signals from microphones relatively further away may be filtered and added to the closest signal. In general, the filter for the microphone that is closest to the desired sound source may be designed with higher latency to minimize the ANC attenuation.

In the example illustrated in FIG. 3, because both the front microphone 310 and rear microphone 311 are approximately equidistant to the undesired talker, either microphone signal may be kept unmodified. However, because the forward microphone 311 is closer to the desired talker 302, the forward microphone may capture the relatively earliest signal of the desired speech (i.e., the desired speech reaches the forward microphone before reaching the rear microphone 310). In order to maximize the delay to the desired speech component in the reference signal, at least in some embodiments, only the forward microphone 311 may be filtered (at any of filters 305-308) and the rear microphone signal may be kept unmodified when creating the beamformer output. Weightings may also be applied (e.g., at filter 307) when choosing inputs from certain microphones. This concept will be described further below with regard to FIGS. 4-7B.

Figure 4:
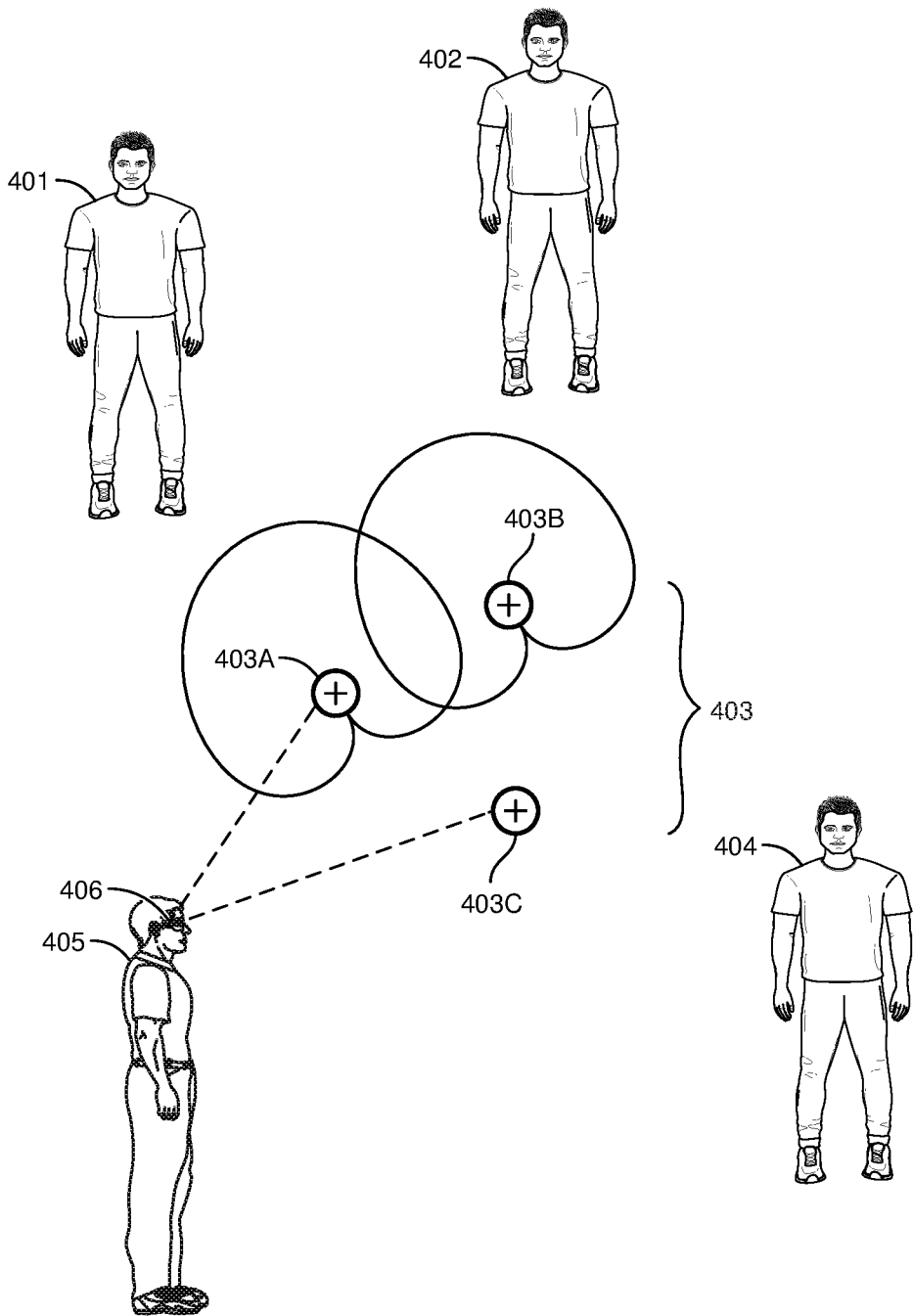
FIG. 4 illustrates an embodiment in which a microphone array of three microphones is used to selectively apply ANC to undesired sound sources.

FIG. 4 illustrates an example in which a user 405 is implementing an electronic device 406 that includes a microphone array 403 with three microphones. As shown in FIG. 4, the user 405 is wearing artificial reality glasses that may include the microphone array 403, although it should be noted that the microphone array 403 may be embedded into and implemented within substantially any type of electronic device 406. The user 405 may be outdoors or in a room speaking to or otherwise interacting with user 404. In some embodiments, the location of user 404 and potentially the location of other users (e.g., 401, 402) or other sound sources may be known to user 405's electronic device 406. For example, electronic device 406 may receive and/or provide simultaneous location and mapping (SLAM) data. The SLAM data may include information about the current location of the electronic device 406, as well as current location information for users 401, 402, 404 and other users. Still further, the SLAM data (which may be part of environment information 119 in FIG. 1) may include information about speakers, televisions, mobile phones, or other electronic devices within the environment. Thus, user 405's electronic device 406 may be aware of the location of many other persons and/or electronic devices within the environment.

The electronic device 406 may use the SLAM data and/or other environment data to determine where to beamform the beam created by the microphone array 403. For example, the SLAM data may identify persons 401 and 402 that are potential sources of noise. If the electronic device 406 determines that user 405's attention is currently directed to user 404, the microphone array 403 may be custom-formed to capture and filter noise coming from users 401 and 402, while allowing sounds from user 404 to travel unopposed. The electronic device 406 may thus use SLAM data or other types of data (e.g., camera data or IMU data) received from other devices or generated by the electronic device 406 itself to determine the spatial location of those sound sources in the environment that are to be captured and used as reference signals to generate an out-of-phase ANC signal designed to attenuate those sounds.

As can be seen in FIG. 4, microphone pairs 403A/403C and 403B/403C may be beamformed toward users 401 and 402, while microphone 403C (which is closest to user 404) is applied with delayed filters. Signals captured by microphones 403A and 403B may be unmodified. The audio signals outputted from the two beamformers may be processed by the electronic device 406 to generate a reference signal. This reference signal may then be used to generate an ANC signal that attenuates or entirely cancels the audio signals from the users 401 and 402, while allowing the audio signals from the user 404 to remain unfiltered and travel to the user without attenuation. Although users 401 and 402 are identified as being undesired sound sources, substantially any source of noise or unwanted sound may be identified within an environment. The location determining module 108 of FIG. 1 may determine a spatial location for those undesired sound sources in the environment, and may also determine a spatial location for those sound sources that are desired. Once the desired and undesired sound sources have been identified and their spatial locations have been determined, the beamforming module 110 may form the microphone beam using the microphone array 403 in FIG. 4, such that a null in the microphone beam is pointed at the desired sound source. As can be seen in FIG. 4, the beams formed by microphone pairs 403A-403C and 403B-403C may each have a null pointed toward the desired sound source 404. In this manner, ANC may be selectively applied to certain users or certain spatial locations.

Figure 5:
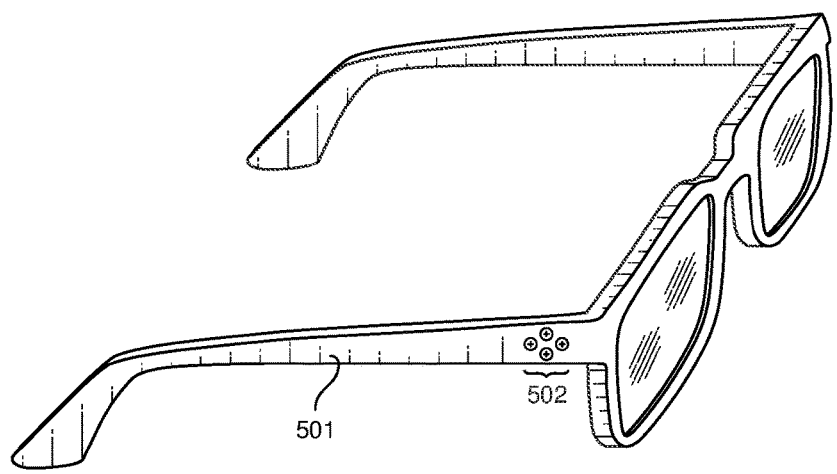
FIG. 5 illustrates an embodiment in which a microphone array of four microphones is embedded in a pair of artificial reality glasses.

In some embodiments, a microphone array may be embedded in a pair of artificial reality glasses. For example, as shown in FIG. 5, a pair of artificial reality glasses 501 may include a microphone array 502. As illustrated, the microphone array 502 has four microphones, although it will be recognized that the microphone array may have substantially any number of microphones. The four microphones in the array 502 may be configured to perform selective ANC. In some embodiments, one, two, or more of the microphones in the array 502 may be closer to a desired sound source than the other microphones in the array. In such cases, the artificial reality glasses 501 may apply a delay to audio information captured by the microphone(s) determined to be closest to the desired sound source. This delay may be designed to ensure that at least a portion of the audio information captured by the microphone determined to be closest to the desired sound source is substantially unattenuated by the out-of-phase ANC signal.

Figure 6:
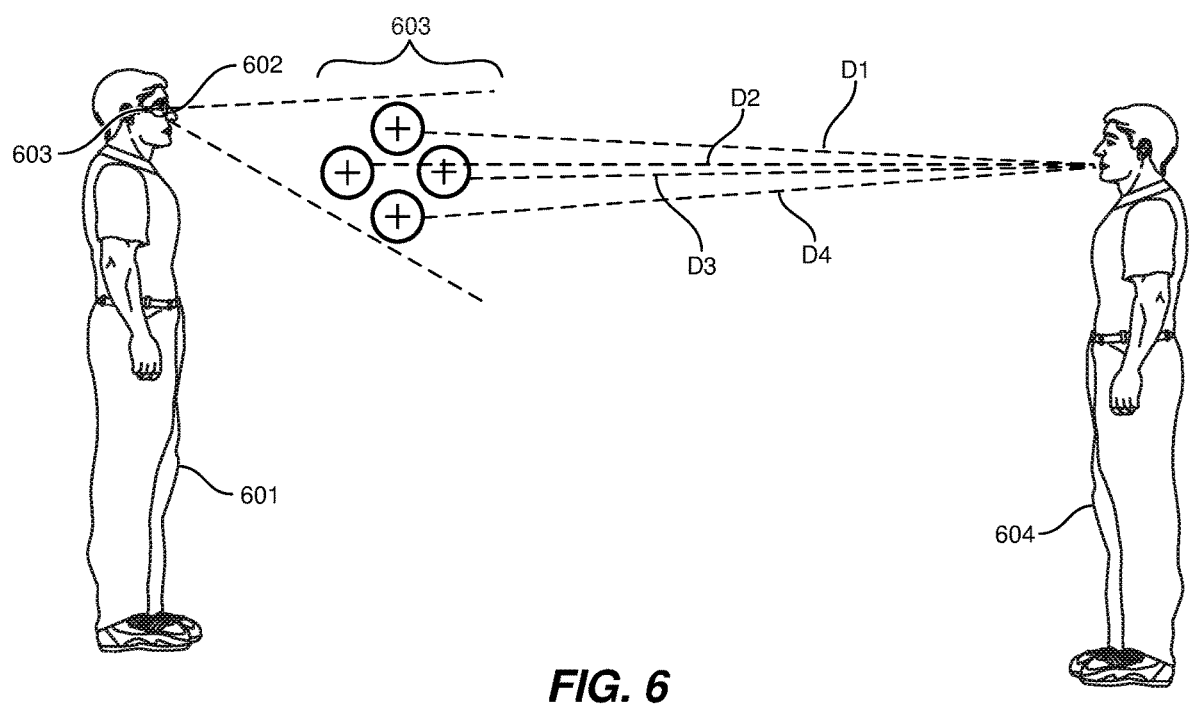
FIG. 6 illustrates an embodiment in which distances to an undesired sound source are determined using a four-microphone array.

Determining the distance from the microphones to a desired (or undesired) sound source may be performed in a variety of ways. For example, identifying the microphone closest to the desired sound source within the environment may be determined using a direction of arrival (DOA) analysis. As shown in FIG. 6, a user 601 may be wearing a pair of artificial reality glasses 602 which may be the same as or different than glasses 501 of FIG. 5. The artificial reality glasses 602 may have an array of microphones 603 that may be configured to receive audio signals from a user (e.g., 604) and perform a DOA analysis. The DOA analysis may include analyzing the intensity, spectra, and/or arrival time of each sound at the artificial reality glasses 602 to determine the direction from which the sounds originated. The DOA analysis may include various algorithms for analyzing the surrounding acoustic environment to determine where the sound source is located.

The DOA analysis may be designed to receive input signals at the microphone array 603 and apply digital signal processing algorithms to the input signals to estimate the direction of arrival (e.g., directions D1, D2, D3, and D4). These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. In this manner, a DOA analysis may be used to identify the location of the sound source.

Additionally or alternatively, the artificial reality glasses 602 may be configured to perform a visual depth analysis to identify an amount of distance between the desired sound source and the closest microphone. The artificial reality glasses 602 may include one or more cameras, depth sensors, or other electronic components may be configured (alone or in combination with audio analysis) to determine the amount of distance between the desired sound source and the closest microphone. This amount of distance may be used when designing the microphone array processing to minimize the information of the desired sound in the ANC reference signal.

Distinguishing between desired sound sources and undesired sound sources within an environment may be performed in a variety of ways. For example, in some cases, the desired sound source may be identified implicitly based on determined user intent. For instance, if a user is in a room with multiple other people, the artificial reality device (or other electronic device) they are using may be configured to determine which way the user is facing, or may be able to determine who the user is talking to, or may be able to determine that the user is focused on a television. As such, the television or person or object at which the user is facing may be implicitly identified as a desired sound source since that object seems to be the focus of the user's intent. In other embodiments, the desired sound source may be identified explicitly based on various user inputs. For instance, the user 601 may use a user interface to explicitly select a user or electronic device as a desired sound source. Then, whenever the user is within audible range of that sound source, the selective ANC may be applied to allow sounds from that identified sound source. In other embodiments, SLAM data, IMU data, camera data, gestures, voice inputs, user eye-head motion, brain wave analysis, or other environment data may be used to determine which sound sources the user would indicate as desirable and may allow sounds from those sources to reach the user substantially unattenuated by ANC.

Figure 7A:
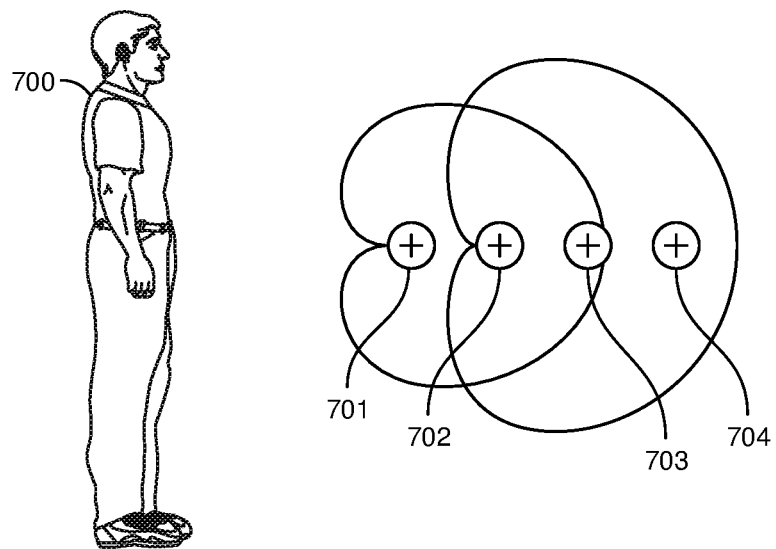
FIGS. 7A and 7B illustrate embodiments in which different microphones from a microphone array are implemented to selectively apply ANC to an undesired sound source.
Figure 7B:
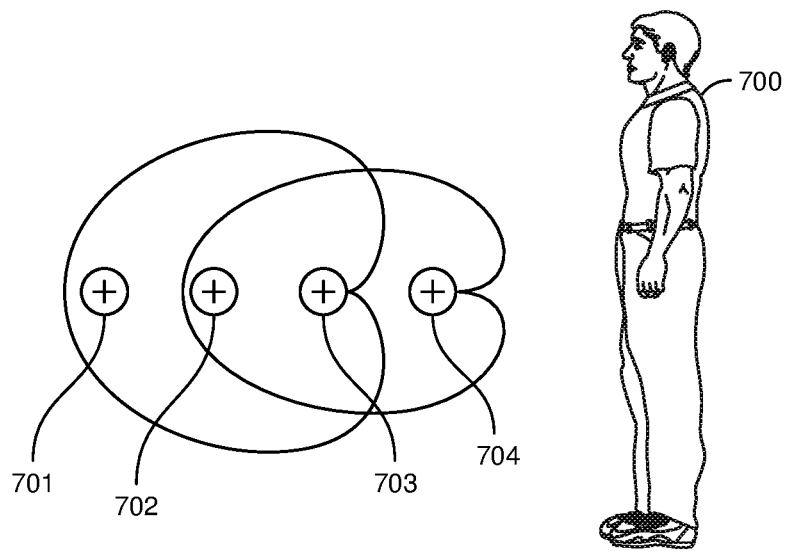

FIGS. 7A and 7B illustrate embodiments in which an array of microphones is arranged in a line. In FIG. 7A, the microphones 701, 702, 703, and 704 are arranged next to each other in a line. In FIG. 7A, two of the microphones (701 and 702) are used to perform the beamforming, with a null being formed in the direction of the desired sound source 700. Whereas in FIG. 7B, when the desired sound source 700 is on the opposite side of the microphone array, two different microphones within the array (703 and 704) may be used to perform the beamforming, with a null being formed in the opposite direction, toward the desired sound source. In other examples, three, four, or more microphones in an array may be used to perform the beamforming. In some cases, the choice of which microphones to use may be made according to where a desired sound source is spatially located. In other cases, the choice of which microphones to use may be made according to which microphones are closest to the desired sound source or the undesired sources. The process of selecting two or more microphones to perform beamforming may be made not just once, but on a continual, periodic basis. As such, if the position of the desired (or undesired) sound source changes positions, different microphones may be used to perform the beamforming.

In some embodiments, as noted above, the selective ANC system (e.g., 100 of FIG. 1) may introduce a delay on audio signals received from the microphone(s) closest to the desired sound source. Adding this delay may ensure that these audio signals are not used as part of the reference signal and are not cancelled out by the ANC signal. The selective ANC system may also take measures to ensure that the audio signal received from the undesired sound sources is processed as quickly as possible to achieve a played-back ANC signal that attenuates as much of the undesired sounds as possible. In some cases, the processing logic used to generate the reference signal 114 and the ANC signal 116 may be hard-coded in an electronically programmable read-only memory (EPROM), application-specific integrated circuit (ASIC), or other similar purpose-built hardware processor. This may allow the reference signal 114 and ANC signal 116 to be generated within microseconds of receiving the audio information.

Other embodiments may implement distributed processing to generate the reference and ANC signals in a similarly quick manner. Thus, the delay when processing undesired speech may be minimized, while the added delay when processing desired speech may be timed to allow the desired sounds to reach the user substantially uninterrupted. In this manner, the combined latency of microphone signals in the reference microphone array and the beamforming processing may be shorter than the sound propagation time between the array microphones and the microphones implemented for ANC.

In some embodiments, forming a reference signal using the audio information captured using the microphone beam may include modifying the reference signal according to a weighting factor. Thus, instead of simply generating the reference signal 114 based on the audio information 118, the signal generating module 113 may introduce a weighting factor and modify the reference signal according to the weighting factor. In some cases, for example, the signal generating module 113 may add more weight to the undesired sound sources if the system is surer that the undesired sound source is actually undesired. For instance, based on where the user is facing, based on the user's determined intent, based on an ongoing conversation with another user, based on the tone or modulation of the undesired sounds, or based on other factors, the system 100 may cancel the undesired sound source with increased surety. In some cases, the weighting factor applied to the reference signal may be variable. As such, the variable weighting factor may allow granular control of a relative attenuation level for different spatially separated sound sources in the environment, increasing or decreasing the relative attenuation level for each sound source as desired.

in some embodiments, specific microphones in an array may perform specific functions. For example, in FIG. 7A, the audio information captured by the closest microphone to the desired source (e.g., 701) may only be used to analyze phase information. Then, the amplitude of the beamformer output signal may be constrained to be the mean or weighted mean of the energy at all microphones in the microphone array. In other embodiments, the phase and amplitude may be normalized by a mean or weighted mean over the array microphones. Thus, for instance, the signal generating module 113 may normalize the reference signal 114 using a mean or weighted mean. In another embodiment involving four microphones, one microphone (e.g., the closest to the desired sound source) may be initially selected as a reference mic, while the other three microphones may be used for beamforming. Subsequently, another microphone may be used as a reference mic, such that two microphones are being used simultaneously as reference microphones. Then a third microphone may be selected as a reference microphone, resulting in three reference signals. In some embodiments, the weighted sum of the three reference signals may be combined and used as the reference signal 114 which is then used to generate the ANC signal 116.

In some cases, a corresponding system may be provided that includes the following: at least one physical processor, and physical memory comprising computer-executable instructions that, when executed by the physical processor, cause the physical processor to: access one or more portions of environment information identifying at least one undesired sound source in the environment, determine, based on the accessed environment information, a spatial location of the at least one undesired sound source in the environment that is to be attenuated using an active noise cancelling (ANC) signal, form a microphone beam, using two or more microphones, directed at the determined spatial location, the microphone beam being configured to capture audio information from the determined spatial location, form a reference signal using the audio information captured using the microphone beam, generate an ANC signal that is out of phase with the reference signal, and play back the generated ANC signal to attenuate the at least one undesired sound source at the determined spatial location.

A corresponding non-transitory computer-readable medium may also be provided that includes one or more computer-executable instructions that, when executed by at least one processor of a computing device, cause the computing device to: access one or more portions of environment information identifying at least one undesired sound source in the environment, determine, based on the accessed environment information, a spatial location of the at least one undesired sound source in the environment that is to be attenuated using an active noise cancelling (ANC) signal, form a microphone beam, using two or more microphones, directed at the determined spatial location, the microphone beam being configured to capture audio information from the determined spatial location, form a reference signal using the audio information captured using the microphone beam, generate an ANC signal that is out of phase with the reference signal, and play back the generated ANC signal to attenuate the at least one undesired sound source at the determined spatial location.

Accordingly, the embodiments described herein may allow active noise cancelling to be applied in a more selective manner that allows a user to still hear desired sound sources by actively beamforming microphones to undesired sound sources. Delays may be added to audio information received from desired sound sources to ensure that those sound sources are not attenuated by the ANC signal. Still further, weights may be added to the generated reference signal to allow more granular control over which sound sources are attenuated or not, and the degree to which each sound source is attenuated by the ANC signal. As the user moves within an environment, spatial information from a variety of sources may be used to inform the selective ANC system where sound sources are located and which sound sources are most likely to be desired (or undesired) by the user.

EXAMPLE EMBODIMENTS

Example 1

A computer-implemented method comprising: accessing one or more portions of environment information identifying at least one undesired sound source in the environment, determining, based on the accessed environment information, a spatial location of the at least one undesired sound source in the environment that is to be attenuated using an active noise cancelling (ANC) signal, forming a microphone beam, using two or more microphones, directed at the determined spatial location, the microphone beam being configured to capture audio information from the determined spatial location, generating an ANC signal using the audio information captured using the microphone beam, the ANC signal including a control sound that is at least partially out of phase with the undesired sound source and has an amplitude that is substantially similar to that of the undesired sound source, and playing back the generated ANC signal to attenuate the at least one undesired sound source at the determined spatial location.

Example 2

The computer-implemented method of Example 1, wherein playing back the generated ANC signal to attenuate the at least one sound source at the determined spatial location includes allowing sounds from other spatial locations to travel unopposed.

Example 3

The computer-implemented method of any of Examples 1 and 2, wherein the environmental information includes simultaneous location and mapping (SLAM) data.

Example 4

The computer-implemented method of any of Examples 1-3, wherein the SLAM data identifies the location of one or more persons within the environment.

Example 5

The computer-implemented method of any of Examples 1-4, wherein data received from a head-mounted display is implemented to determine the spatial location of the at least one sound source in the environment that is to be attenuated using the ANC signal.

Example 6

The computer-implemented method of any of Examples 1-5, further comprising: identifying at least one desired sound source within the environment, determining a spatial location of the at least one desired sound source in the environment, and forming the microphone beam, using the two or more microphones, such that a null in the microphone beam is pointed at the at least one desired sound source.

Example 7

The computer-implemented method of any of Examples 1-6, further comprising: determining which of the two or more microphones forming the microphone beam is closest to the desired sound source within the environment, and applying a delay to audio information captured by the microphone determined to be closest to the desired sound source, wherein the delay ensures that at least a portion of the audio information captured by the microphone determined to be closest to the desired sound source is substantially unattenuated by the out-of-phase ANC signal.

Example 8

The computer-implemented method of any of Examples 1-7, wherein the microphone closest to the desired sound source within the environment is determined using a direction of arrival (DOA) analysis or a visual depth analysis to identify an amount of distance between the desired sound source and the closest microphone.

Example 9

The computer-implemented method of any of Examples 1-8, wherein the determined amount of distance between the desired sound source and the closest microphone is implemented when designing the microphone array to minimize the audio information of the desired sound source in the generated ANC signal.

Example 10

The computer-implemented method of any of Examples 1-9, wherein the desired sound source is identified implicitly based on determined user intent.

Example 11

The computer-implemented method of any of Examples 1-10, wherein the desired sound source is identified explicitly based on one or more user inputs.

Example 12

A system comprising: at least one physical processor, and physical memory comprising computer-executable instructions that, when executed by the physical processor, cause the physical processor to: access one or more portions of environment information identifying at least one undesired sound source in the environment, determine, based on the accessed environment information, a spatial location of the at least one undesired sound source in the environment that is to be attenuated using an active noise cancelling (ANC) signal, form a microphone beam, using two or more microphones, directed at the determined spatial location, the microphone beam being configured to capture audio information from the determined spatial location, generate an ANC signal using the audio information captured using the microphone beam, the ANC signal including a control sound that is at least partially out of phase with the undesired sound source and has an amplitude that is substantially similar to that of the undesired sound source, and play back the generated ANC signal to attenuate the at least one undesired sound source at the determined spatial location.

Example 13

The system of Example 12, wherein the microphone beam is formed from an array of three or more microphones.

Example 14

The system of any of Examples 12 and 13, wherein two of the three or more microphones are selected to form the microphone beam.

Example 15

The system of any of Examples 12-14, wherein the selection of two specific microphones to form the microphone beam is made on a continual, periodic basis.

Example 16

The system of any of Examples 12-15, wherein the selection of two specific microphones to form the microphone beam is made according to the determined spatial location of the at least one undesired sound.

Example 17

The system of any of Examples 12-16, wherein forming a reference signal using the audio information captured using the microphone beam includes modifying the reference signal according to a weighting factor.

Example 18

The system of any of Examples 12-17, wherein the weighting factor is variable for the reference signal, the variable weighting factor allowing granular control of a relative attenuation level for different spatially separated sound sources in the environment.

Example 19

The system of any of Examples 12-18, wherein the system comprises a pair of artificial reality glasses that includes a microphone array having two or more microphones.

Example 20

A non-transitory computer-readable medium comprising one or more computer-executable instructions that, when executed by at least one processor of a computing device, cause the computing device to: access one or more portions of environment information identifying at least one undesired sound source in the environment, determine, based on the accessed environment information, a spatial location of the at least one undesired sound source in the environment that is to be attenuated using an active noise cancelling (ANC) signal, form a microphone beam, using two or more microphones, directed at the determined spatial location, the microphone beam being configured to capture audio information from the determined spatial location, generate an ANC signal using the audio information captured using the microphone beam, the ANC signal including a control sound that is at least partially out of phase with the undesired sound source and has an amplitude that is substantially similar to that of the undesired sound source, and play back the generated ANC signal to attenuate the at least one undesired sound source at the determined spatial location.

Embodiments of the present disclosure may include or be implemented in conjunction with various types of artificial reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs), an example of which is augmented-reality system 800 in FIG. 8. Other artificial reality systems may include a NED that also provides visibility into the real world (e.g., augmented-reality system 900 in FIG. 9) or that visually immerses a user in an artificial reality (e.g., virtual-reality system 1000 in FIG. 10). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 8:
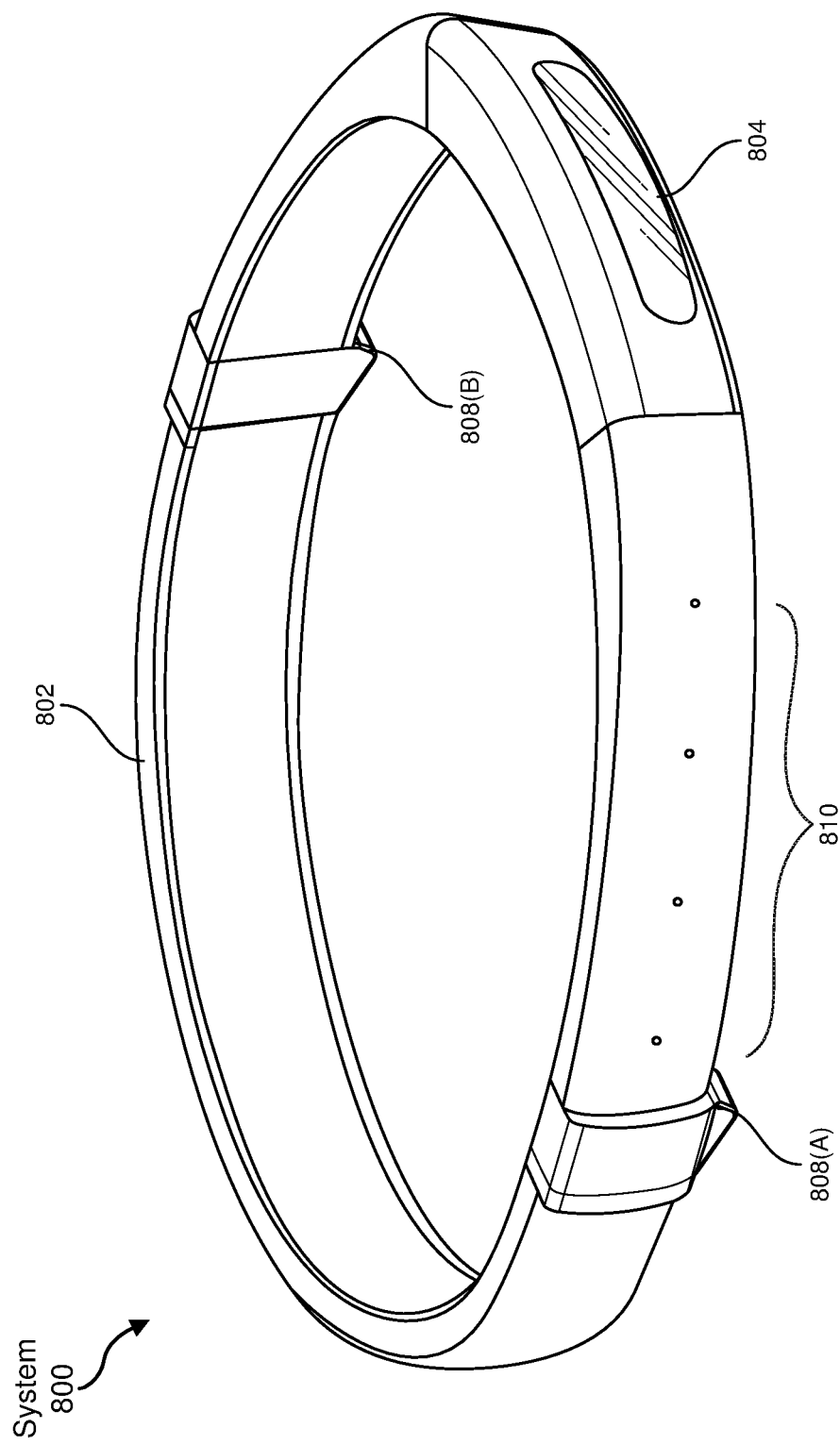
FIG. 8 is an illustration of an exemplary artificial-reality headband that may be used in connection with embodiments of this disclosure.

Turning to FIG. 8, augmented-reality system 800 generally represents a wearable device dimensioned to fit about a body part (e.g., a head) of a user. As shown in FIG. 8, system 800 may include a frame 802 and a camera assembly 804 that is coupled to frame 802 and configured to gather information about a local environment by observing the local environment. Augmented-reality system 800 may also include one or more audio devices, such as output audio transducers 808(A) and 808(B) and input audio transducers 810. Output audio transducers 808(A) and 808(B) may provide audio feedback and/or content to a user, and input audio transducers 810 may capture audio in a user's environment.

As shown, augmented-reality system 800 may not necessarily include a NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 800 may not include a NED, augmented-reality system 800 may include other types of screens or visual feedback devices (e.g., a display screen integrated into a side of frame 802).

Figure 9:
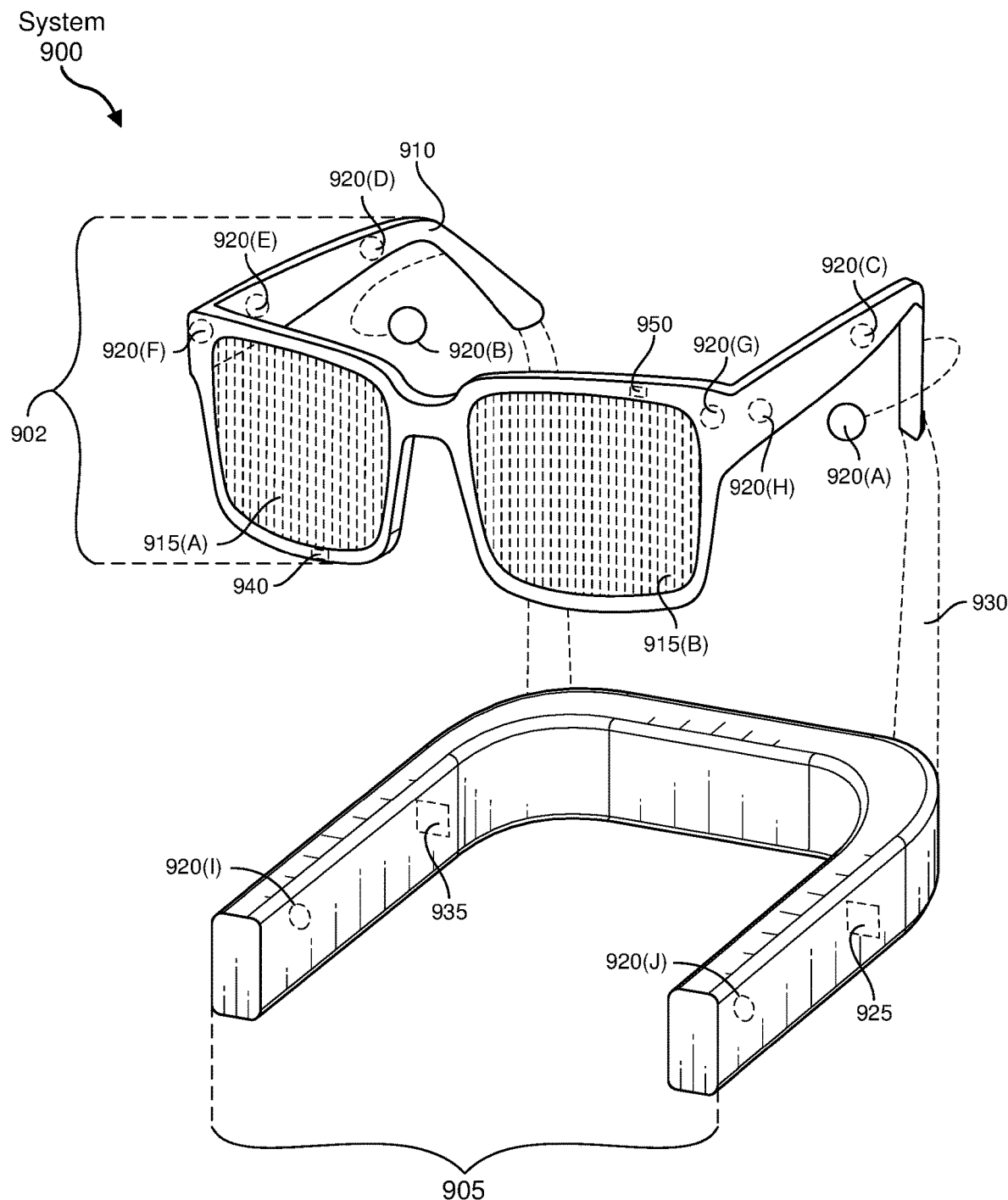
FIG. 9 is an illustration of exemplary augmented-reality glasses that may be used in connection with embodiments of this disclosure.

The embodiments discussed in this disclosure may also be implemented in augmented-reality systems that include one or more NEDs. For example, as shown in FIG. 9, augmented-reality system 900 may include an eyewear device 902 with a frame 910 configured to hold a left display device 915(A) and a right display device 915(B) in front of a user's eyes. Display devices 915(A) and 915(B) may act together or independently to present an image or series of images to a user. While augmented-reality system 900 includes two displays, embodiments of this disclosure may be implemented in augmented-reality systems with a single NED or more than two NEDs.

In some embodiments, augmented-reality system 900 may include one or more sensors, such as sensor 940. Sensor 940 may generate measurement signals in response to motion of augmented-reality system 900 and may be located on substantially any portion of frame 910. Sensor 940 may represent a position sensor, an inertial measurement unit (IMU), a depth camera assembly, or any combination thereof. In some embodiments, augmented-reality system 900 may or may not include sensor 940 or may include more than one sensor. In embodiments in which sensor 940 includes an IMU, the IMU may generate calibration data based on measurement signals from sensor 940. Examples of sensor 940 may include, without limitation, accelerometers, gyroscopes, magnetometers, other suitable types of sensors that detect motion, sensors used for error correction of the IMU, or some combination thereof.

Augmented-reality system 900 may also include a microphone array with a plurality of acoustic transducers 920(A)-920(J), referred to collectively as acoustic transducers 920. Acoustic transducers 920 may be transducers that detect air pressure variations induced by sound waves. Each acoustic transducer 920 may be configured to detect sound and convert the detected sound into an electronic format (e.g., an analog or digital format). The microphone array in FIG. 2 may include, for example, ten acoustic transducers: 920(A) and 920(B), which may be designed to be placed inside a corresponding ear of the user, acoustic transducers 920(C), 920(D), 920(E), 920(F), 920(G), and 920(H), which may be positioned at various locations on frame 910, and/or acoustic transducers 920(1) and 920(J), which may be positioned on a corresponding neckband 905.

In some embodiments, one or more of acoustic transducers 920(A)-(F) may be used as output transducers (e.g., speakers). For example, acoustic transducers 920(A) and/or 920(B) may be earbuds or any other suitable type of headphone or speaker.

The configuration of acoustic transducers 920 of the microphone array may vary. While augmented-reality system 900 is shown in FIG. 9 as having ten acoustic transducers 920, the number of acoustic transducers 920 may be greater or less than ten. In some embodiments, using higher numbers of acoustic transducers 920 may increase the amount of audio information collected and/or the sensitivity and accuracy of the audio information. In contrast, using a lower number of acoustic transducers 920 may decrease the computing power required by the controller 950 to process the collected audio information. In addition, the position of each acoustic transducer 920 of the microphone array may vary. For example, the position of an acoustic transducer 920 may include a defined position on the user, a defined coordinate on frame 910, an orientation associated with each acoustic transducer, or some combination thereof.

Acoustic transducers 920(A) and 920(B) may be positioned on different parts of the user's ear, such as behind the pinna or within the auricle or fossa. Or, there may be additional acoustic transducers on or surrounding the ear in addition to acoustic transducers 920 inside the ear canal. Having an acoustic transducer positioned next to an ear canal of a user may enable the microphone array to collect information on how sounds arrive at the ear canal. By positioning at least two of acoustic transducers 920 on either side of a user's head (e.g., as binaural microphones), augmented-reality device 900 may simulate binaural hearing and capture a 3D stereo sound field around about a user's head. In some embodiments, acoustic transducers 920(A) and 920(B) may be connected to augmented-reality system 900 via a wired connection 930, and in other embodiments, acoustic transducers 920(A) and 920(B) may be connected to augmented-reality system 900 via a wireless connection (e.g., a Bluetooth connection). In still other embodiments, acoustic transducers 920(A) and 920(B) may not be used at all in conjunction with augmented-reality system 900.

Acoustic transducers 920 on frame 910 may be positioned along the length of the temples, across the bridge, above or below display devices 915(A) and 915(B), or some combination thereof. Acoustic transducers 920 may be oriented such that the microphone array is able to detect sounds in a wide range of directions surrounding the user wearing the augmented-reality system 900. In some embodiments, an optimization process may be performed during manufacturing of augmented-reality system 900 to determine relative positioning of each acoustic transducer 920 in the microphone array.

In some examples, augmented-reality system 900 may include or be connected to an external device (e.g., a paired device), such as neckband 905. Neckband 905 generally represents any type or form of paired device. Thus, the following discussion of neckband 905 may also apply to various other paired devices, such as charging cases, smart watches, smart phones, wrist bands, other wearable devices, hand-held controllers, tablet computers, laptop computers and other external compute devices, etc.

As shown, neckband 905 may be coupled to eyewear device 902 via one or more connectors. The connectors may be wired or wireless and may include electrical and/or non-electrical (e.g., structural) components. In some cases, eyewear device 902 and neckband 905 may operate independently without any wired or wireless connection between them. While FIG. 9 illustrates the components of eyewear device 902 and neckband 905 in example locations on eyewear device 902 and neckband 905, the components may be located elsewhere and/or distributed differently on eyewear device 902 and/or neckband 905. In some embodiments, the components of eyewear device 902 and neckband 905 may be located on one or more additional peripheral devices paired with eyewear device 902, neckband 905, or some combination thereof.

Pairing external devices, such as neckband 905, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 900 may be provided by a paired device or shared between a paired device and an eyewear device, thus reducing the weight, heat profile, and form factor of the eyewear device overall while still retaining desired functionality. For example, neckband 905 may allow components that would otherwise be included on an eyewear device to be included in neckband 905 since users may tolerate a heavier weight load on their shoulders than they would tolerate on their heads. Neckband 905 may also have a larger surface area over which to diffuse and disperse heat to the ambient environment. Thus, neckband 905 may allow for greater battery and computation capacity than might otherwise have been possible on a stand-alone eyewear device. Since weight carried in neckband 905 may be less invasive to a user than weight carried in eyewear device 902, a user may tolerate wearing a lighter eyewear device and carrying or wearing the paired device for greater lengths of time than a user would tolerate wearing a heavy standalone eyewear device, thereby enabling users to more fully incorporate artificial reality environments into their day-to-day activities.

Neckband 905 may be communicatively coupled with eyewear device 902 and/or to other devices. These other devices may provide certain functions (e.g., tracking, localizing, depth mapping, processing, storage, etc.) to augmented-reality system 900. In the embodiment of FIG. 9, neckband 905 may include two acoustic transducers (e.g., 920(1) and 920(J)) that are part of the microphone array (or potentially form their own microphone subarray). Neckband 905 may also include a controller 925 and a power source 935.

Acoustic transducers 920(1) and 920(J) of neckband 905 may be configured to detect sound and convert the detected sound into an electronic format (analog or digital). In the embodiment of FIG. 9, acoustic transducers 920(1) and 920(J) may be positioned on neckband 905, thereby increasing the distance between the neckband acoustic transducers 920(1) and 920(J) and other acoustic transducers 920 positioned on eyewear device 902. In some cases, increasing the distance between acoustic transducers 920 of the microphone array may improve the accuracy of beamforming performed via the microphone array. For example, if a sound is detected by acoustic transducers 920(C) and 920(D) and the distance between acoustic transducers 920(C) and 920(D) is greater than, e.g., the distance between acoustic transducers 920(D) and 920(E), the determined source location of the detected sound may be more accurate than if the sound had been detected by acoustic transducers 920(D) and 920(E).

Controller 925 of neckband 905 may process information generated by the sensors on 905 and/or augmented-reality system 900. For example, controller 925 may process information from the microphone array that describes sounds detected by the microphone array. For each detected sound, controller 925 may perform a direction-of-arrival (DOA) estimation to estimate a direction from which the detected sound arrived at the microphone array. As the microphone array detects sounds, controller 925 may populate an audio data set with the information. In embodiments in which augmented-reality system 900 includes an inertial measurement unit, controller 925 may compute all inertial and spatial calculations from the IMU located on eyewear device 902. A connector may convey information between augmented-reality system 900 and neckband 905 and between augmented-reality system 900 and controller 925. The information may be in the form of optical data, electrical data, wireless data, or any other transmittable data form. Moving the processing of information generated by augmented-reality system 900 to neckband 905 may reduce weight and heat in eyewear device 902, making it more comfortable to the user.

Power source 935 in neckband 905 may provide power to eyewear device 902 and/or to neckband 905. Power source 935 may include, without limitation, lithium ion batteries, lithium-polymer batteries, primary lithium batteries, alkaline batteries, or any other form of power storage. In some cases, power source 935 may be a wired power source. Including power source 935 on neckband 905 instead of on eyewear device 902 may help better distribute the weight and heat generated by power source 935.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 1000 in FIG. 10, that mostly or completely covers a user's field of view. Virtual-reality system 1000 may include a front rigid body 1002 and a band 1004 shaped to fit around a user's head. Virtual-reality system 1000 may also include output audio transducers 1006(A) and 1006(B). Furthermore, while not shown in FIG. 10, front rigid body 1002 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in augmented-reality system 1000 and/or virtual-reality system 1000 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in augmented-reality system 900 and/or virtual-reality system 1000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, augmented-reality system 800, augmented-reality system 900, and/or virtual-reality system 1000 may include one or more optical sensors, such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 8 and 10, output audio transducers 808(A), 808(B), 1006(A), and 1006(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 810 may include condenser microphones, dynamic microphones, ribbon microphones, and/or any other type or form of input transducer. In some embodiments, a single transducer may be used for both audio input and audio output.

Figure 10:
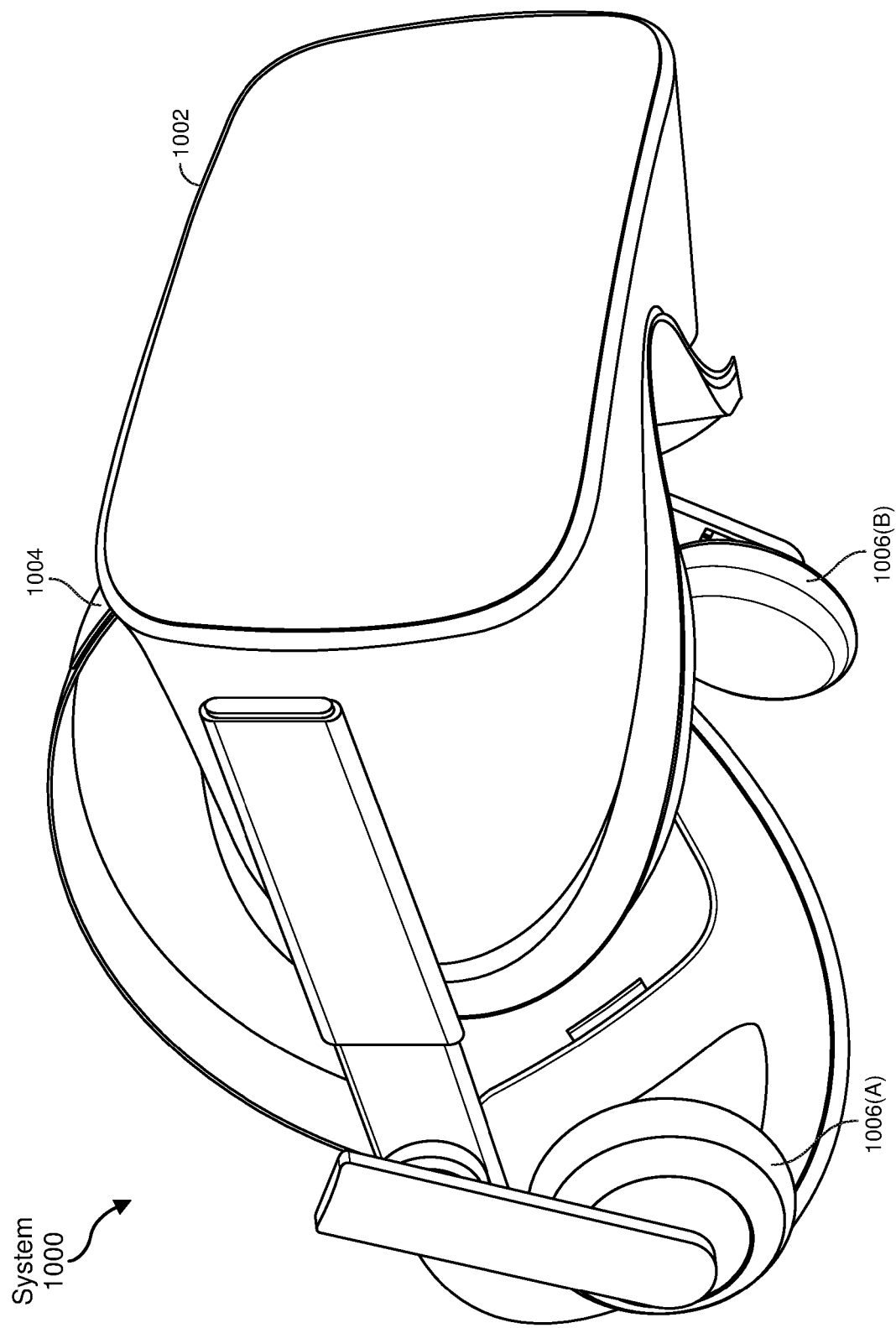
FIG. 10 is an illustration of an exemplary virtual-reality headset that may be used in connection with embodiments of this disclosure.

While not shown in FIGS. 8-10, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

Some augmented reality systems may map a user's and/or device's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, Bluetooth, global positioning system (GPS), cellular or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. Augmented reality and virtual reality devices (such as systems 800, 900, and 1000 of FIGS. 8-10, respectively) may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

When the user is wearing an augmented reality headset or virtual reality headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to as "localization," and the process of rendering playback of the audio source signal to appear as if it is coming from a specific direction may be referred to as "spatialization."

Localizing an audio source may be performed in a variety of different ways. In some cases, an augmented reality or virtual reality headset may initiate a DOA analysis to determine the location of a sound source. The DOA analysis may include analyzing the intensity, spectra, and/or arrival time of each sound at the artificial reality device to determine the direction from which the sounds originated. The DOA analysis may include any suitable algorithm for analyzing the surrounding acoustic environment in which the artificial reality device is located.

For example, the DOA analysis may be designed to receive input signals from a microphone and apply digital signal processing algorithms to the input signals to estimate the direction of arrival. These algorithms may include, for example, filter and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. The artificial reality device may provide an alignment and orientation guide, which the user may follow to customize the sound signal presented to the user based on their unique HRTF. In some embodiments, an artificial reality device may implement one or more microphones to listen to sounds within the user's environment. The augmented reality or virtual reality headset may use a variety of different array transfer functions (e.g., any of the DOA algorithms identified above) to estimate the direction of arrival for the sounds. Once the direction of arrival has been determined, the artificial reality device may play back sounds to the user according to the user's unique HRTF. Accordingly, the DOA estimation generated using the array transfer function (ATF) may be used to determine the direction from which the sounds are to be played from. The playback sounds may be further refined based on how that specific user hears sounds according to the HRTF.

In addition to or as an alternative to performing a DOA estimation, an artificial reality device may perform localization based on information received from other types of sensors. These sensors may include cameras, IR sensors, heat sensors, motion sensors, GPS receivers, or in some cases, sensors that detect a user's eye movements. For example, as noted above, an artificial reality device may include an eye tracker or gaze detector that determines where the user is looking. Often, the user's eyes will look at the source of the sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an "acoustic transfer function" may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial reality device may include one or more acoustic sensors that detect sounds within range of the device. A controller of the artificial reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial reality device may re-render (i.e., spatialize) the sound signals to sound as if coming from the direction of that sound source. The artificial reality device may apply filters or other digital signal processing that alter the intensity, spectra, or arrival time of the sound signal. The digital signal processing may be applied in such a way that the sound signal is perceived as originating from the determined location. The artificial reality device may amplify or subdue certain frequencies or change the time that the signal arrives at each ear. In some cases, the artificial reality device may create an acoustic transfer function that is specific to the location of the device and the detected direction of arrival of the sound signal. In some embodiments, the artificial reality device may re-render the source signal in a stereo device or multi-speaker device (e.g., a surround sound device). In such cases, separate and distinct audio signals may be sent to each speaker. Each of these audio signals may be altered according to the user's HRTF and according to measurements of the user's location and the location of the sound source to sound as if they are coming from the determined location of the sound source. Accordingly, in this manner, the artificial reality device (or speakers associated with the device) may re-render an audio signal to sound as if originating from a specific location.

As noted, artificial reality systems 800, 900, and 1000 may be used with a variety of other types of devices to provide a more compelling artificial reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 11:
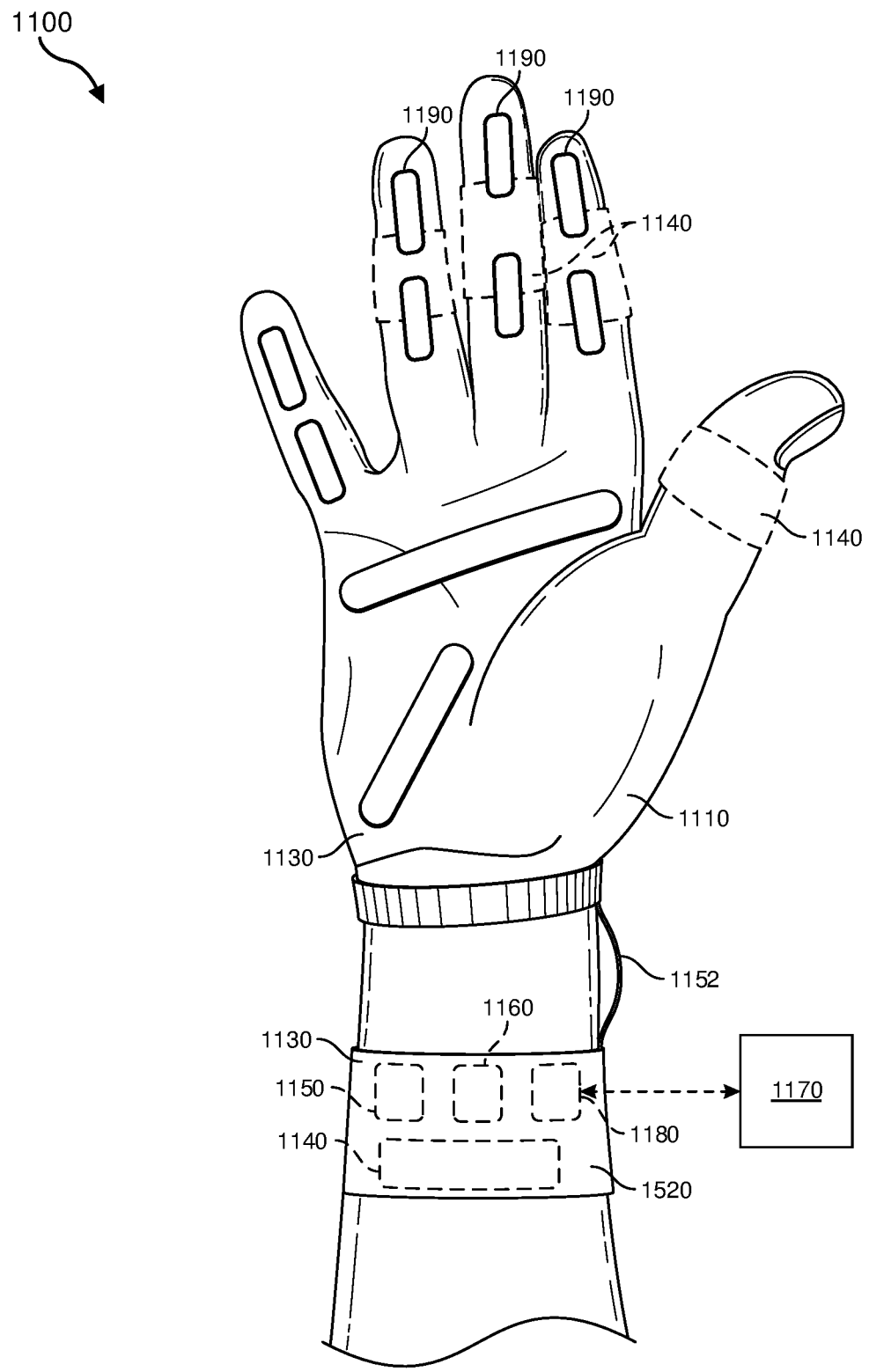
FIG. 11 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 11 illustrates a vibrotactile system 1100 in the form of a wearable glove (haptic device 1110) and wristband (haptic device 1120). Haptic device 1110 and haptic device 1120 are shown as examples of wearable devices that include a flexible, wearable textile material 1130 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1140 may be positioned at least partially within one or more corresponding pockets formed in textile material 1130 of vibrotactile system 1100. Vibrotactile devices 1140 may be positioned in locations to provide a vibrating sensation (e.g., haptic feedback) to a user of vibrotactile system 1100. For example, vibrotactile devices 1140 may be positioned to be against the user's finger(s), thumb, or wrist, as shown in FIG. 11. Vibrotactile devices 1140 may, in some examples, be sufficiently flexible to conform to or bend with the user's corresponding body part(s).

A power source 1150 (e.g., a battery) for applying a voltage to the vibrotactile devices 1140 for activation thereof may be electrically coupled to vibrotactile devices 1140, such as via conductive wiring 1152. In some examples, each of vibrotactile devices 1140 may be independently electrically coupled to power source 1150 for individual activation. In some embodiments, a processor 1160 may be operatively coupled to power source 1150 and configured (e.g., programmed) to control activation of vibrotactile devices 1140.

Vibrotactile system 1100 may be implemented in a variety of ways. In some examples, vibrotactile system 1100 may be a standalone system with integral subsystems and components for operation independent of other devices and systems. As another example, vibrotactile system 1100 may be configured for interaction with another device or system 1170. For example, vibrotactile system 1100 may, in some examples, include a communications interface 1180 for receiving and/or sending signals to the other device or system 1170. The other device or system 1170 may be a mobile device, a gaming console, an artificial reality (e.g., virtual reality, augmented reality, mixed reality) device, a personal computer, a tablet computer, a network device (e.g., a modem, a router, etc.), a handheld controller, etc. Communications interface 1180 may enable communications between vibrotactile system 1100 and the other device or system 1170 via a wireless (e.g., Wi-Fi, Bluetooth, cellular, radio, etc.) link or a wired link. If present, communications interface 1180 may be in communication with processor 1160, such as to provide a signal to processor 1160 to activate or deactivate one or more of the vibrotactile devices 1140.

Vibrotactile system 1100 may optionally include other subsystems and components, such as touch-sensitive pads 1190, pressure sensors, motion sensors, position sensors, lighting elements, and/or user interface elements (e.g., an on/off button, a vibration control element, etc.). During use, vibrotactile devices 1140 may be configured to be activated for a variety of different reasons, such as in response to the user's interaction with user interface elements, a signal from the motion or position sensors, a signal from the touch-sensitive pads 1190, a signal from the pressure sensors, a signal from the other device or system 1170, etc.

Although power source 1150, processor 1160, and communications interface 1180 are illustrated in FIG. 11 as being positioned in haptic device 1120, the present disclosure is not so limited. For example, one or more of power source 1150, processor 1160, or communications interface 1180 may be positioned within haptic device 1110 or within another wearable textile.

Figure 12:
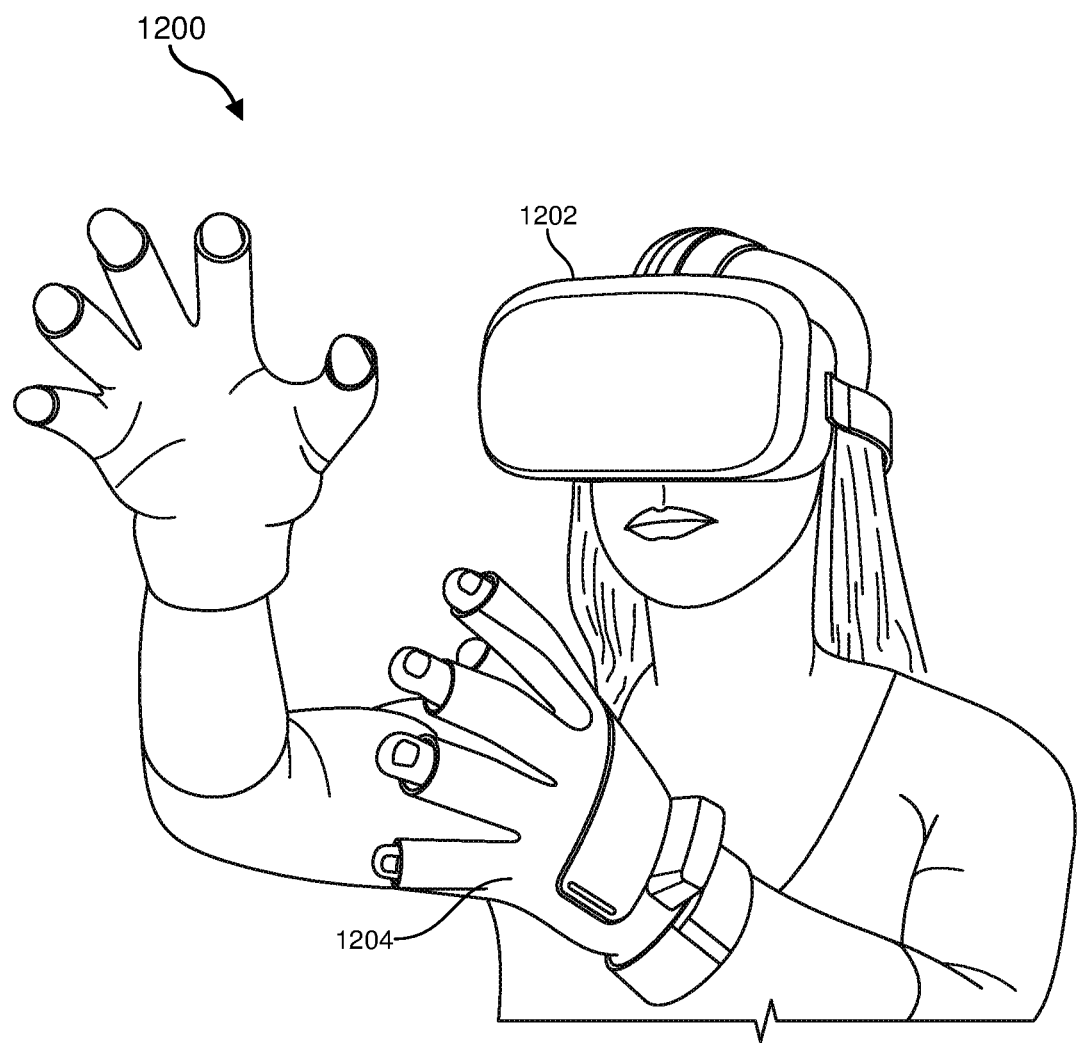
FIG. 12 is an illustration of an exemplary virtual-reality environment according to embodiments of this disclosure.

Haptic wearables, such as those shown in and described in connection with FIG. 11, may be implemented in a variety of types of artificial-reality systems and environments. FIG. 12 shows an example artificial reality environment 1200 including one head-mounted virtual-reality display and two haptic devices (i.e., gloves), and in other embodiments any number and/or combination of these components and other components may be included in an artificial reality system. For example, in some embodiments there may be multiple head-mounted displays each having an associated haptic device, with each head-mounted display and each haptic device communicating with the same console, portable computing device, or other computing system.

Head-mounted display 1202 generally represents any type or form of virtual-reality system, such as virtual-reality system 1000 in FIG. 10. Haptic device 1204 generally represents any type or form of wearable device, worn by a use of an artificial reality system, that provides haptic feedback to the user to give the user the perception that he or she is physically engaging with a virtual object. In some embodiments, haptic device 1204 may provide haptic feedback by applying vibration, motion, and/or force to the user. For example, haptic device 1204 may limit or augment a user's movement. To give a specific example, haptic device 1204 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 1204 to send action requests to a console. Examples of action requests include, without limitation, requests to start an application and/or end the application and/or requests to perform a particular action within the application.

Figure 13:
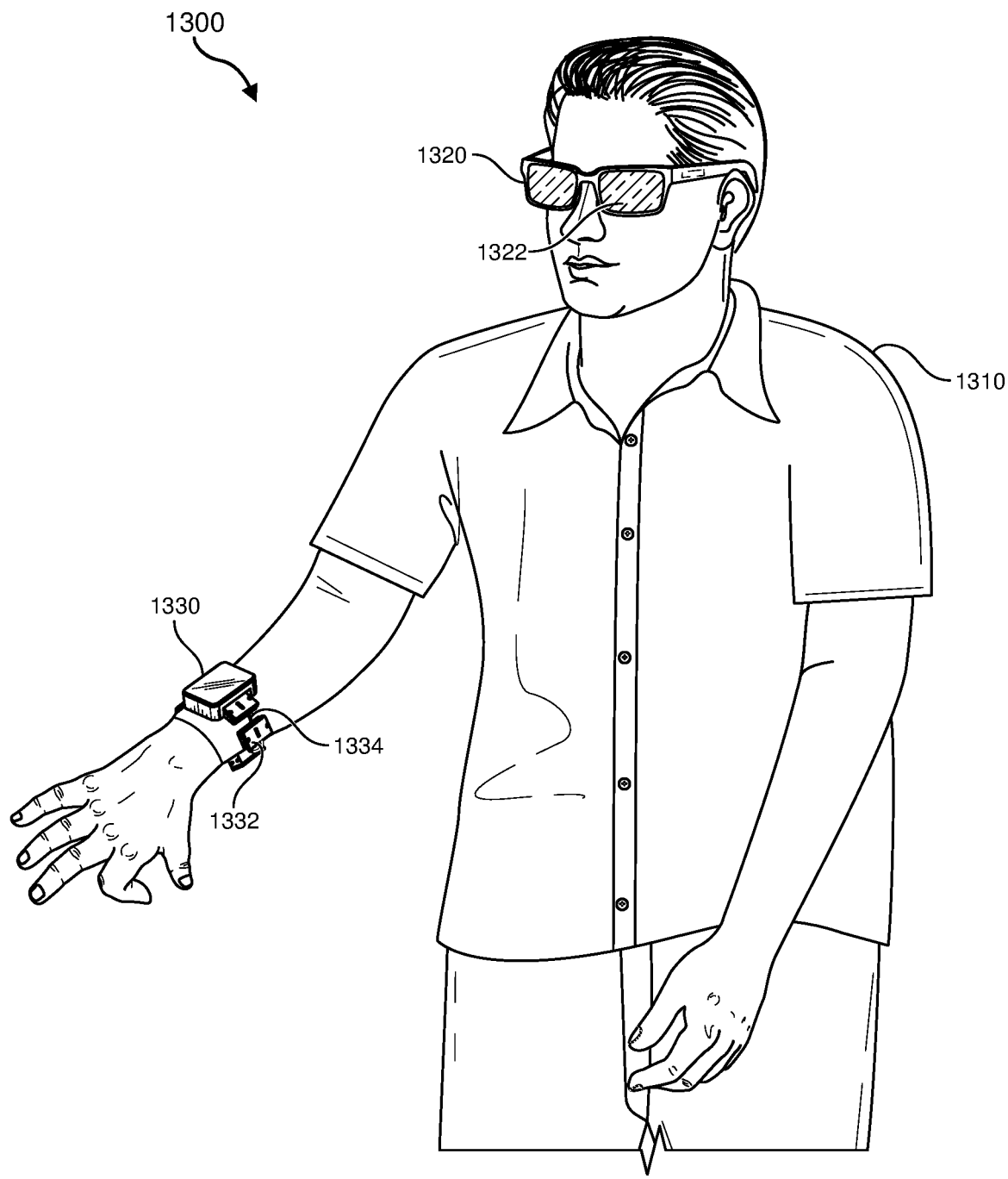
FIG. 13 is an illustration of an exemplary augmented-reality environment according to embodiments of this disclosure.

While haptic interfaces may be used with virtual-reality systems, as shown in FIG. 12, haptic interfaces may also be used with augmented-reality systems, as shown in FIG. 13. FIG. 13 is a perspective view a user 1310 interacting with an augmented-reality system 1300. In this example, user 1310 may wear a pair of augmented-reality glasses 1320 that have one or more displays 1322 and that are paired with a haptic device 1330. Haptic device 1330 may be a wristband that includes a plurality of band elements 1332 and a tensioning mechanism 1334 that connects band elements 1332 to one another.

One or more of band elements 1332 may include any type or form of actuator suitable for providing haptic feedback. For example, one or more of band elements 1332 may be configured to provide one or more of various types of cutaneous feedback, including vibration, force, traction, texture, and/or temperature. To provide such feedback, band elements 1332 may include one or more of various types of actuators. In one example, each of band elements 1332 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1110, 1120, 1204, and 1330 may include any suitable number and/or type of haptic transducer, sensor, and/or feedback mechanism. For example, haptic devices 1110, 1120, 1204, and 1330 may include one or more mechanical transducers, piezoelectric transducers, and/or fluidic transducers. Haptic devices 1110, 1120, 1204, and 1330 may also include various combinations of different types and forms of transducers that work together or independently to enhance a user's artificial-reality experience. In one example, each of band elements 1332 of haptic device 1330 may include a vibrotactor (e.g., a vibrotactile actuator) configured to vibrate in unison or independently to provide one or more of various types of haptic sensations to a user.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to identify an undesired sound source, and use the result of the transformation to perform selective ANC. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    accessing one or more portions of environment information identifying at least one undesired sound source in the environment;
    determining, based on the accessed environment information, a spatial location of the at least one undesired sound source in the environment that is to be attenuated using an active noise cancelling (ANC) signal;
    forming a microphone beam, using two or more microphones, directed at the determined spatial location, the microphone beam being configured to capture audio information from the determined spatial location;
    generating an ANC signal using the audio information captured using the microphone beam, the ANC signal including a control sound that is at least partially out of phase with the undesired sound source and has an amplitude that is substantially similar to that of the undesired sound source, wherein generating the ANC signal further includes adding a delay of a specified amount of time to the audio information captured by the microphone determined to be closest to a desired sound source when processing desired sounds from the desired sound source; and
    playing back the generated ANC signal to attenuate the at least one undesired sound source at the determined spatial location, wherein the desired sounds from the desired sound source are played back after the added delay.

2. The computer-implemented method of claim 1, wherein playing back the generated ANC signal to attenuate the at least one sound source at the determined spatial location includes allowing sounds from other spatial locations to travel unopposed.

3. The computer-implemented method of claim 1, wherein the environmental information includes simultaneous location and mapping (SLAM) data.

4. The computer-implemented method of claim 3, wherein the SLAM data identifies the location of one or more persons within the environment.

5. The computer-implemented method of claim 1, wherein data received from a head-mounted display is implemented to determine the spatial location of the at least one sound source in the environment that is to be attenuated using the ANC signal.

6. The computer-implemented method of claim 1, further comprising:
identifying at least one desired sound source within the environment;
determining a spatial location of the at least one desired sound source in the environment; and
forming the microphone beam, using the two or more microphones, such that a null in the microphone beam is pointed at the at least one desired sound source.

7. The computer-implemented method of claim 6, further comprising:
determining which of the two or more microphones forming the microphone beam is closest to the desired sound source within the environment; and
applying a long delay beamforming filter to audio information captured by the microphone determined to be closest to the desired sound source, wherein the delay ensures that at least a portion of the audio information captured by the microphone determined to be closest to the desired sound source is unattenuated by the out-of-phase ANC signal.

8. The computer-implemented method of claim 7, wherein the microphone closest to the desired sound source within the environment is determined using a direction of arrival (DOA) analysis or a visual depth analysis to identify an amount of distance between the desired sound source and the closest microphone.

9. The computer-implemented method of claim 8, wherein the determined amount of distance between the desired sound source and the closest microphone is implemented when designing the microphone array to minimize the audio information of the desired sound source in the generated ANC signal.

10. The computer-implemented method of claim 6, wherein the desired sound source is identified implicitly based on determined user intent.

11. The computer-implemented method of claim 6, wherein the desired sound source is identified explicitly based on one or more user inputs.

12. A system comprising:
at least one physical processor;
physical memory comprising computer-executable instructions that, when executed by the physical processor, cause the physical processor to:
access one or more portions of environment information identifying at least one undesired sound source in the environment;
determine, based on the accessed environment information, a spatial location of the at least one undesired sound source in the environment that is to be attenuated using an active noise cancelling (ANC) signal;
form a microphone beam, using two or more microphones, directed at the determined spatial location, the microphone beam being configured to capture audio information from the determined spatial location;
generate an ANC signal using the audio information captured using the microphone beam, the ANC signal including a control sound that is at least partially out of phase with the undesired sound source and has an amplitude that is substantially similar to that of the undesired sound source, wherein generating the ANC signal further includes adding a delay of a specified amount of time to the audio information captured by the microphone determined to be closest to a desired sound source when processing desired sounds from the desired sound source; and
play back the generated ANC signal to attenuate the at least one undesired sound source at the determined spatial location, wherein the desired sounds from the desired sound source are played back after the added delay.

13. The system of claim 12, wherein the microphone beam is formed from an array of three or more microphones.

14. The system of claim 13, wherein two of the three or more microphones are selected to form the microphone beam.

15. The system of claim 14, wherein the selection of two specific microphones to form the microphone beam is made on a continual, periodic basis.

16. The system of claim 14, wherein the selection of two specific microphones to form the microphone beam is made according to the determined spatial location of the at least one undesired sound.

17. The system of claim 12, wherein forming a reference signal using the audio information captured using the microphone beam includes modifying the reference signal according to a weighting factor.

18. The system of claim 17, wherein the weighting factor is variable for the reference signal, the variable weighting factor allowing granular control of a relative attenuation level for different spatially separated sound sources in the environment.

19. The system of claim 12, wherein the system comprises a pair of artificial reality glasses that includes a microphone array having two or more microphones.

20. A non-transitory computer-readable medium comprising one or more computer-executable instructions that, when executed by at least one processor of a computing device, cause the computing device to:
access one or more portions of environment information identifying at least one undesired sound source in the environment;
determine, based on the accessed environment information, a spatial location of the at least one undesired sound source in the environment that is to be attenuated using an active noise cancelling (ANC) signal;
form a microphone beam, using two or more microphones, directed at the determined spatial location, the microphone beam being configured to capture audio information from the determined spatial location;
generate an ANC signal using the audio information captured using the microphone beam, the ANC signal including a control sound that is at least partially out of phase with the undesired sound source and has an amplitude that is substantially similar to that of the undesired sound source, wherein generating the ANC signal further includes adding a delay of a specified amount of time to the audio information captured by the microphone determined to be closest to a desired sound source when processing desired sounds from the desired sound source; and
play back the generated ANC signal to attenuate the at least one undesired sound source at the determined spatial location, wherein the desired sounds from the desired sound source are played back after the added delay.

* * * * *